(12) United States Patent
Schutt

(10) Patent No.: US 11,693,971 B2
(45) Date of Patent: Jul. 4, 2023

(54) BOOTLOADER VERIFICATION EXTENSION

(71) Applicant: TRUSTONIC LIMITED, Cambridge (GB)

(72) Inventor: Nicholas Schutt, Cambridge (GB)

(73) Assignee: Trustonic Limited, Cambridge (GB)

( * ) Notice: Subject to any disclaimer, the term of this patent is extended or adjusted under 35 U.S.C. 154(b) by 598 days.

(21) Appl. No.: 16/684,856

(22) Filed: Nov. 15, 2019

(65) Prior Publication Data

US 2020/0159931 A1    May 21, 2020

(30) Foreign Application Priority Data

Nov. 16, 2018 (GB) ...................... 1818710

(51) Int. Cl.
*G06F 21/57* (2013.01)
*H04L 9/06* (2006.01)
*H04L 9/08* (2006.01)
*H04L 9/32* (2006.01)

(52) U.S. Cl.
CPC .......... *G06F 21/575* (2013.01); *H04L 9/0643* (2013.01); *H04L 9/0825* (2013.01); *H04L 9/3247* (2013.01)

(58) Field of Classification Search
CPC ... G06F 21/575; H04L 9/0894; H04L 9/3239; H04L 9/3247
See application file for complete search history.

(56) References Cited

U.S. PATENT DOCUMENTS

| | | | | |
|---|---|---|---|---|
| 2007/0179904 A1* | 8/2007 | Hofstee | ................ | H04L 9/0897 705/67 |
| 2010/0287363 A1* | 11/2010 | Thorsen | ................ | G06F 9/4406 713/2 |
| 2013/0125244 A1* | 5/2013 | Sugano | ................... | G06F 21/44 726/26 |
| 2013/0205370 A1* | 8/2013 | Kalgi | .................... | G06F 21/316 726/3 |
| 2014/0195804 A1* | 7/2014 | Hursti | ................. | H04L 63/0428 713/168 |
| 2015/0074384 A1* | 3/2015 | Yajima | .................. | G06F 21/575 713/2 |
| 2015/0172292 A1* | 6/2015 | Kuang | ................ | H04L 63/0884 713/155 |
| 2017/0366525 A1* | 12/2017 | Takagi | .................... | H04L 63/20 |
| 2018/0198629 A1* | 7/2018 | Deymonnaz | .......... | H04L 9/3265 |
| 2019/0007835 A1* | 1/2019 | Li | ....................... | H04W 12/069 |
| 2020/0084042 A1* | 3/2020 | Nelson | ................. | H04L 9/3247 |

FOREIGN PATENT DOCUMENTS

| WO | 2010/066304 | 6/2010 |
|---|---|---|
| WO | 2014/059136 | 4/2014 |

OTHER PUBLICATIONS

Combined Search and Examination Report for GB 1818710.4, dated May 2, 2019, 8 pages.

* cited by examiner

*Primary Examiner* — Jaweed A Abbaszadeh
*Assistant Examiner* — Cheri L Harrington
(74) *Attorney, Agent, or Firm* — Nixon & Vanderhye P.C.

(57) ABSTRACT

Device verification extension technology obtains, in response to a request to verify a signature associated with first data, an asymmetric verifier application from off-device storage. The asymmetric verifier application is loaded and executed. The signature associated with the first data is verified using the asymmetric verifier application using asymmetric-key cryptography.

16 Claims, 3 Drawing Sheets

BOOTLOADER VERIFICATION EXTENSION

This application claims priority to GB Patent Application No. 1818710.4 filed 16 Nov. 2018, the entire contents of which is hereby incorporated by reference.

FIELD AND BACKGROUND

The present techniques relate to the field of electronic devices. More particularly, they relate to enabling a device to perform asymmetric verification of data.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it can be important to ensure that software updates to these devices are securely performed and haven't been compromised or otherwise manipulated by a malicious party.

Cryptographic techniques can be provided which are capable of verifying software updates received by the device. However, in very small computing devices such as sensors, actuators or other devices in the IoT, memory storage capacity, processing power and communication bandwidth can be extremely constrained which can limit the cryptographic techniques which can be performed. Furthermore, such devices typically lack dedicated cryptographic hardware.

In performing secure software updates on a device, it is generally better to use asymmetric cryptography instead of symmetric cryptography, since the use of asymmetric cryptography removes the high risk of a leaked symmetric-key rendering the security useless. However, given the limited capabilities of IoT devices, the use of asymmetric cryptography has proven infeasible due to the size of the asymmetric cryptography software reserving a significant portion of an IoT device's storage capacity for activities (i.e. verification of software updates) that are rarely performed.

At least certain embodiments of the present disclosure address one or more of these problems as set out above.

SUMMARY

Particular aspects and embodiments are set out in the appended claims.

Viewed from one perspective, there can be provided a verification extension method for a device, the method comprising: obtaining, in response to a request to verify a signature associated with first data, an asymmetric verifier application from off-device storage; loading the asymmetric verifier application; executing the asymmetric verifier application; verifying, using the asymmetric verifier application, the signature associated with the first data using asymmetric-key cryptography.

By storing the asymmetric verifier application in off-device storage, and obtaining the asymmetric verifier application when required, the need to permanently reserve memory on the device for the asymmetric verifier application is avoided. Thereby it is made feasible for a capability constrained device such as an IoT device to utilize high-security asymmetric-key cryptography.

In some examples, the signature associated with the first data is a signature of a hash of the first data. Thereby, by only needing to verify the signature of a hash, as opposed to the entire first data, computational complexity in the verification of the signature can be reduced.

In some examples, the first data is a further application. Thereby, the integrity/security of an application can be verified before the application is loaded/installed and executed. In some examples, the first application can be software used to perform specific tasks such as writing flash, formatting storage, importing a key or programming fuses.

In some examples, prior to executing the asymmetric verifier application the device verifies, using a first hashing function and an initial application hash, the asymmetric verifier application and responsive to a positive verification result, the device executes the asymmetric verifier application. Thereby the integrity of the asymmetric verifier application itself can be confirmed thus further enhancing security by avoiding the possibility of a malicious party presenting a fake asymmetric verifier application to the device.

In some examples, the asymmetric verifier application is verified using a master bootloader of the device. Thus the asymmetric verifier application can be verified by a low-level process of the device thus avoiding the need for further intermediate processes which may introduce computational overhead and additional points of security vulnerability.

In some examples, the initial application hash is retrieved from on-device storage. Thereby the space needed to avoid storage of the initial application hash on the device can be avoided. In addition, by not storing the initial application hash in on-device storage the risk that it could be extracted from the device is reduced hence enhancing security.

In some examples, the initial application hash is embedded on the device during manufacture or assembly of the device. Thereby, the initial application hash is immediately available when required (i.e. further delays while it is obtained can therefore be avoided) and the initial application hash is resistant to modification/tampering by a malicious party after manufacture or assembly of the device. Further, by avoiding the need to communicate (e.g. transmit) the initial application hash to the device, the communication bandwidth needed to communicate the initial application hash to the device can be saved, which can be of particular importance in bandwidth-constrained devices such as IoT devices.

In addition, by not communicating/transmitting the initial application hash, the potential for it to be intercepted, or modified during communication/transmission (e.g. so that the initial application hash corresponded to an arbitrary non-approved application), by a malicious party is avoided. Yet further the distribution of the initial application hash can in this manner be controlled by the manufacturer or assembler without the need to trust another party.

In some examples, the asymmetric verifier application verifies the signature using one or more keys stored in on-device storage. Thereby, by storing the one or more keys in on-device storage, the one or more keys are immediately available when required (i.e. further delays while they are obtained can be avoided). Further, by avoiding the need to communicate/transmit the one or more keys the communication bandwidth needed to communicate the one or more keys to the device can be saved, which can be of particular importance in bandwidth-constrained devices such as IoT devices. In addition, by not communicating/transmitting the one or more keys, the potential for it to be intercepted by a malicious party is avoided.

In some examples, a plurality of keys are stored in on-device storage, wherein each of the keys is associated with a privilege level, and wherein restrictions associated with the privilege level of the key which verifies the signature associated with the first data are applied to that first data. Thereby, the device is enabled to handle a range of data, to which different restrictions associated with privilege levels are to be applied, using the same verification process. Thus, the need for a plurality of different processes to verify data with different privilege levels can be avoided thereby reducing the storage space required and reducing complexity.

In some examples, the one or more keys are embedded on the device during manufacture or assembly of the device. Thereby, the one or more keys are immediately available when required (i.e. further delays while they are obtained can therefore be avoided) and the one or more keys are resistant to modification/tampering by a malicious party after manufacture or assembly of the device. Further, by avoiding the need to communicate/transmit the one or more keys, the communication bandwidth needed to communicate the one or more keys to the device can be saved, which can be of particular importance in bandwidth-constrained devices such as IoT devices.

In addition, by not communicating/transmitting the one or more keys, the potential for them to be intercepted by a malicious party is avoided. Yet further the distribution of the one or more keys can in this manner be controlled by the manufacturer or assembler without the need to trust another party.

In some examples, the asymmetric verifier application verifies the signature using one or more keys embedded in the asymmetric verifier application. Thereby, the one or more keys can be provided to the device in an integrated package together with the asymmetric verifier application.

In some examples, responsive to a positive or a negative verification of the signature associated with the first data, the asymmetric verifier application is unloaded. Thereby, the memory occupied by the asymmetric verifier application can be recovered after use freeing this up for other uses. For example, by unloading the asymmetric verifier application enough memory may be freed up to allow a firmware update to be performed. More generally, for example, unloading the asymmetric verifier application allows for software updates to be performed on the device using memory size-optimal footprints for the software updates.

In some examples, a plurality of signatures corresponding to a plurality of data including the first data are verified using the asymmetric verifier application and responsive to completion of the plurality of signatures being individually positively or negatively verified, the asymmetric verifier application is unloaded.

Thereby the device can, by allowing for the verification of a plurality of signatures with a single instance of obtaining, loading and executing the asymmetric verifier application, avoid the need to obtain and/or load and/or execute the asymmetric verifier application multiple times thereby saving communication bandwidth. Furthermore, by verifying a plurality of signatures in this manner the verification results can be provided in a more timely and efficient manner. In other words, the device can avoid repeatedly swapping the asymmetric verifier application in and out of memory.

In some examples, responsive to a positive verification of the signature associated with the first data, the first data is loaded. Thereby, the data is actually made available to the device. Where the data is an application, the loading of the device may include an installation process for the application. In some examples, for example where the data is sufficiently small, the signature may be directly of the data itself thereby avoiding the need to use and verify a hash of the data.

In some examples, the signature associated with the first data is a signature of a hash of the first data and responsive to a positive verification of the signature associated with the first data, the hash of the first data is stored on the device. Thereby, the device now has a hash of the data ready to verify first data as and when this is received. For large items of data, the use of a signature of a hash may be more efficient as the asymmetric verification of signatures tend to be far more computational intensive then the computational intensity of verifying a hash. As such, it is more efficient to verify a small hash of large first data and asymmetrically verify the signature of the small hash than just asymmetrically verify the large first data.

In some examples, the method further comprises: obtaining the first data; loading the first data; and verifying, using the hash of the first data and a second hashing function, the first data. In other words, for example, the device generates a hash of the obtained first data and checks whether the hash of obtained first data matches a hash that the device has previously stored or otherwise has available (e.g. a hash verified by the asymmetric verifier application). Thereby, when the signature is associated with the first data is a signature of a hash of the first data, the first data can be obtained and verified using the hash previously stored on the device.

In some examples, in response to a positive verification of the first data using the second hashing function, the first data is executed or made available for use by executable code. Thereby, when the first data is a further application, the further application is actually executed on the device and, when the first data is non-executable code, the first data is made available for use by executable code on the device. In some examples, where no matching hash is found for an obtained piece of data the data is not executed or made available for use by executable code and optionally a user or operator is alerted to the lack of a match.

In some examples, after the first data has been executed or made available for use by executable code the hash of the first data is removed from the device. Thereby, the space associated with storing the first hash on the device can be recovered. Furthermore, this can act to prevent the first data being verified again at a further point in time (i.e. since the hash of the first data is no longer available to the device).

In some examples, the first hashing function and the second hashing function algorithms use the same computational function but take different data as inputs. Thereby, only a single computational hashing function need be stored on the device thus saving space and, in general, allowing for further hardware/software optimisation of the performance of the hashing function. Furthermore, in some examples, exactly the same hashing process can be used to verify the first data as was used to verify the asymmetric verifier application, for example, using the master bootloader of the device. Therefore, from one perspective the device can simply check the list of all the hashes stored on the device in response to receiving a piece of first data (e.g. the asymmetric verifier application or a further application) and see if any of these match a hash of the received piece of first data generated by the device itself.

In some examples, the device does not include a hardware asymmetric verifier circuitry. Thereby, any asymmetric verification is unable to be performed directly in hardware and instead must be performed in software. This, saves the costs and physical space associated with accommodating dedicated asymmetric verifier circuitry on the device. This is particularly important for IoT devices which can be highly constrained in performance, size and energy consumption.

Viewed from one perspective, there can be provided a computer program for controlling a device to perform any of the above-described methods. In some examples, the computer program is stored on a storage medium.

Viewed from one perspective, there can be provided an apparatus comprising: processing circuitry to perform data processing; and data storage storing a computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

Figure 1:
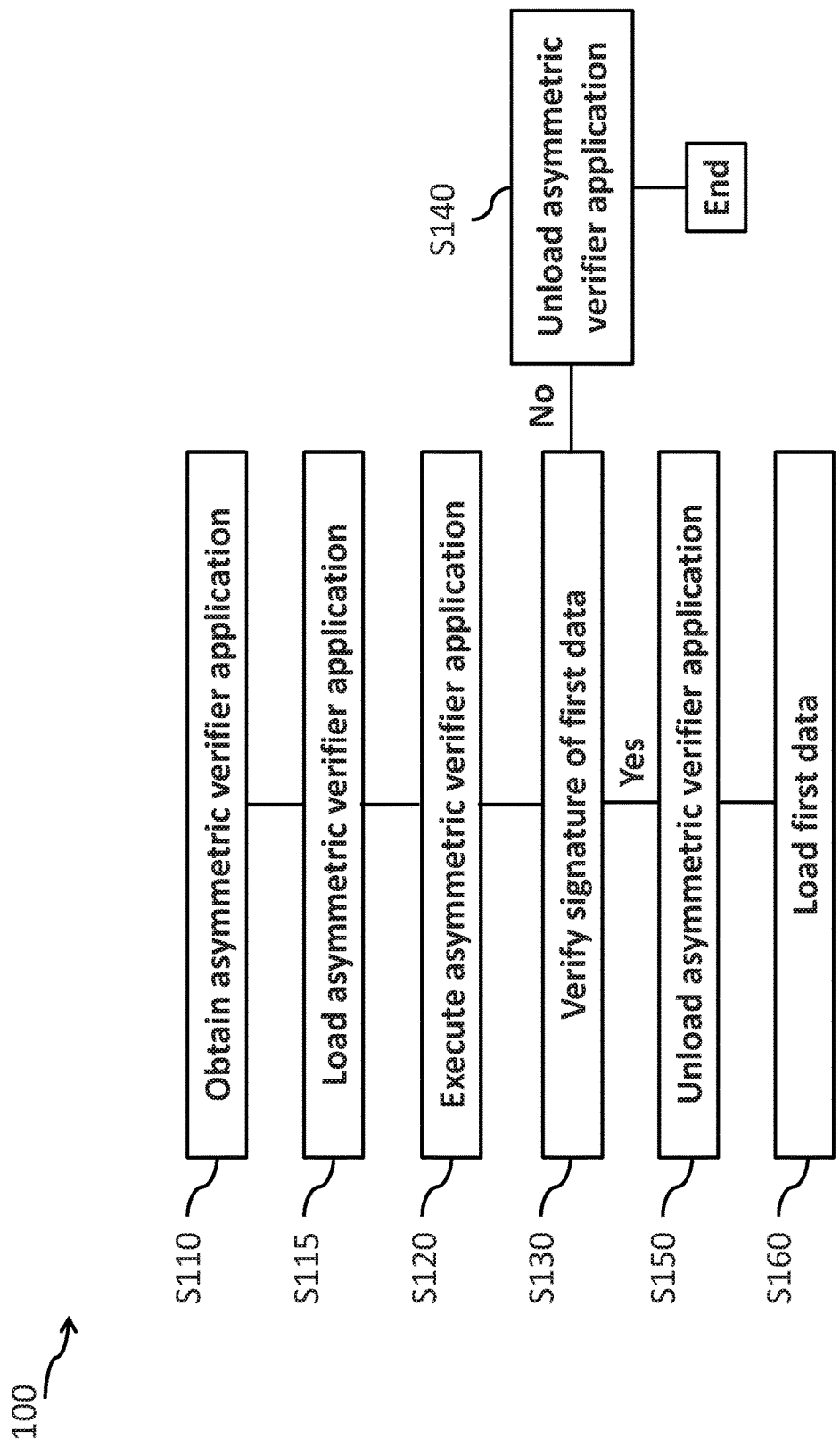
FIG. 1: Schematically illustrates a first example method according to teachings of the disclosure for enabling a device to perform asymmetric verification of data.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

FIG. 1 shows a schematic illustration of a first example method 100 according to teachings of the disclosure for enabling a device to perform asymmetric verification of data which includes the following steps.

At step S110, an asymmetric verifier application is obtained by the device from off-device storage in response to a request to verify a signature associated with first data. The method then continues on to step S115.

At step S115, the device loads the asymmetric verifier application. The method then continues on to step S120.

At step S120, the device executes the asymmetric verifier application. The method then continues on to step S130.

At step S130, the device verifies the signature associated with the first data using the asymmetric verifier application to perform asymmetric-key cryptography. The asymmetric verifier application verifies the signature using one or more keys. These one or more keys may be stored or retrieved from a number of different locations. In some examples, at least one of the one or more keys are stored in on-device storage on the device itself.

In some examples, a plurality of keys are stored in on-device storage where each of the keys are associated with a different privilege level. Each privilege level is associated with one or more restrictions and the privilege level of the key which verifies the signature associated with a particular piece of data (e.g. first data) determines what restrictions are applied to that piece of data (i.e. the restrictions corresponding the particular key are applied). For example, one key may be a top-level key which allows privileged-mode execution on the device and may, for example, be used by the device manufacturer/assembler itself. Another key, for example, may not permit execution and may be provided, for example, to third parties.

Additionally or alternatively, in some examples at least one of the one or more keys are embedded on the device during manufacture or assembly of the device, for example, by a manufacturer or assemble of the device. In some examples, the device may have been manufactured/assembled by a plurality of manufacturers/assemblers and each of these manufacturers/assemblers may embed one or more keys into the device. Additionally or alternatively, in some examples at least one of the one or more keys may be embedded in the asymmetric verifier application such that the one of the one or more keys is obtained by the device integrally with the asymmetric verifier application when the asymmetric verifier application is obtained. In some examples, the one or more keys are not permanently stored in on-device storage of the device and may instead be obtained by the device on-demand from off-device storage when required.

In some examples, a plurality of signatures corresponding to a plurality of data may be verified by the asymmetric verifier application during a single obtaining, loading and executing event of the asymmetric verifier application prior to any unloading of the asymmetric verifier application.

In response to a negative verification of the signature associated with the first data at step S130 the method proceeds to step S140. At step S140 the asymmetric verifier application is unloaded. It is explicitly contemplated that in some examples the asymmetric verifier application is not unloaded in response to a negative verification. For example, the asymmetric verifier application could be kept loaded and/or executing on the device to allow for the verification of a second piece of data at some future point in time.

In response to a positive verification of the signature associated with the first data at step S130 the method proceeds to step S150. At step S150 the asymmetric verifier application is unloaded. It is explicitly contemplated that in some examples the asymmetric verifier application is not unloaded in response to a positive verification. For example, the asymmetric verifier application could be kept loaded and/or executing on the device until a specific trigger condition has been met such as an acknowledgement by a user or remote device that no further data needs to be validated at the present time. The method then continues on to step S160.

At step S160, in response to the positive verification of the signature associated with the first data, the first data is loaded. It is explicitly contemplated that in some examples step S160 is performed before step S150. It is also explicitly contemplated that in some examples that the first data is only loaded at some future point in time or not at all. For example, the device may pre-emptively verify the signature associated with the first data in case the first data is required at some future point in time.

Figure 2:
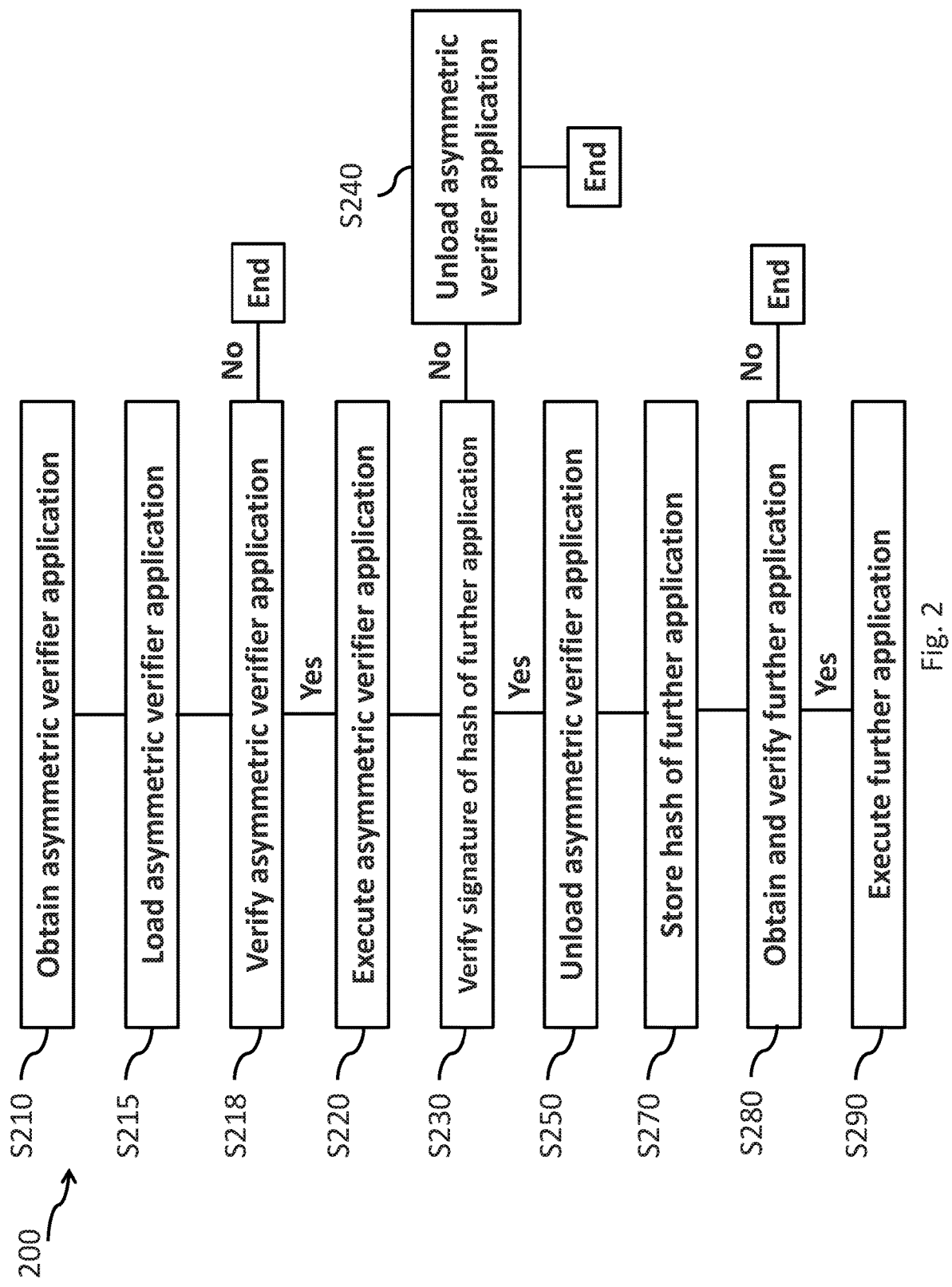
FIG. 2: Schematically illustrates a second example method according to teachings of the disclosure for enabling a device to perform asymmetric verification of data.

FIG. 2 shows a schematic illustration of a second example method 200 according to teachings of the disclosure for enabling a device to perform asymmetric verification of data which includes the following steps.

A number of the steps performed in the second example method proceed in a substantially identical manner to the corresponding steps performed in the first example method except where otherwise described and therefore will not be discussed in detail again. Specifically, step S210 is substantially identical to step S110, step S215 is substantially identical to step S115, step S220 is substantially identical to step S120, step S230 is substantially identical to step S130, step S240 is substantially identical to step S140 and step S250 is substantially identical to step S150.

In the second example method, subsequent to step S215, but preceding step S220, step S218 is performed. At step S218, prior to executing the asymmetric verifier application, the asymmetric verifier application is itself verified. The asymmetric verifier application is verified through the use of a first hashing function and an initial application hash. For example, a hash is generated by the device of the asymmetric verifier application and it is checked whether this generated hash matches the initial application hash. The first hashing function may be a cryptographic hashing function to further enhance security. Examples of suitable hashing algorithms include MD5, the family of SHA (e.g. SHA-256) or any other suitable hashing algorithm.

In some examples the asymmetric verifier application is verified using a low-level process of the device such as a master bootloader of the device. In some examples, the initial application hash is retrieved from on-device storage. In other examples, the initial application hash may be retrieved on demand from off-device storage. In some examples the initial application hash is embedded in the on-device storage during manufacture or assembly of the device. During manufacture/assembly, in some examples, the initial application hash may be the only hash stored on the device immediately after manufacture/assembly.

Responsive to a positive verification result, the method proceeds to step S220 and the asymmetric verifier application is executed. Responsive to a negative verification result, the asymmetric verifier application is not executed. In some examples, responsive to a negative verification result the asymmetric verifier application may be unloaded.

In the second example method, the signature associated with the first data is a signature of a hash of the first data. Further, in the second example method, the first data is a further application (e.g. a secure sensing application, a banking application or a device security monitor). It is explicitly contemplated, that the first example method could also be carried out with the signature associated with the first data being a signature of a hash of the first data and the first data being a further application.

Conversely, it is explicitly contemplated that the second example method could be carried out where the signature associated with the first data is not a signature of a hash of the first data and where the first data is not a further application (e.g. is non-executable data).

In the depicted example, however, the method proceeds to step S230, after the asymmetric verifier application is executed at S220, and at step S230 the signature of a hash of a further application is verified.

In FIG. 2, step S250 is depicted as being performed immediately after step S230 and before step S270. It is, however, explicitly contemplated that step S250 could alternatively be performed subsequent to step S270 and prior to step S280, or step S250 could alternatively be performed subsequent to step S280 and before step S290, or step S250 could alternatively be performed subsequent to step S290.

At step S270, responsive to a positive verification of the hash of the further application at step S230, the hash of the further application is stored on the device. In other examples, the hash of the further application may be stored in off-device storage.

At step S280, the device obtains and loads the further application and performs a verification process on the further application. Specifically, the device verifies the obtained further application using the stored hash of the further application together with a second hashing function, for example, by generating a hash of the obtained further application by the device itself and comparing this to the stored hash of the further application.

As with the first hashing function, the second hashing function may be a cryptographic hashing function to further enhance security. Examples of suitable hashing algorithms include MD5, the family of SHA (e.g. SHA-256) or any other suitable hashing algorithm. In some examples the first hashing function and the second hashing function algorithms use the same computational function but take different data as inputs.

Responsive to a positive verification of the further application at step S280, the depicted method proceeds to step S290 where the further application is executed. In other examples, the further application may not be immediately executed in response to a positive verification and instead the device is left in a condition where it is ready to execute the further application on demand at some future point. Responsive to a negative verification of the further application at step S280 the further application is not executed and in some examples the further application is unloaded. In some examples, after the first application has been executed onto the device the hash of the first application may be discarded to recover the memory used by the hash.

While specific steps are presented as being present and carried out in a particular order in FIGS. 1 and 2, it will be appreciated that various of these steps are optional and/or can be carried out in alternate orders. A number of such optional steps and alternate orders have been explicitly recited in the description of the first and second example methods above, however, it is explicitly contemplated that certain other steps may be optional and/or carried out in an alternate order, for example, as set out in the claim set.

Figure 3:
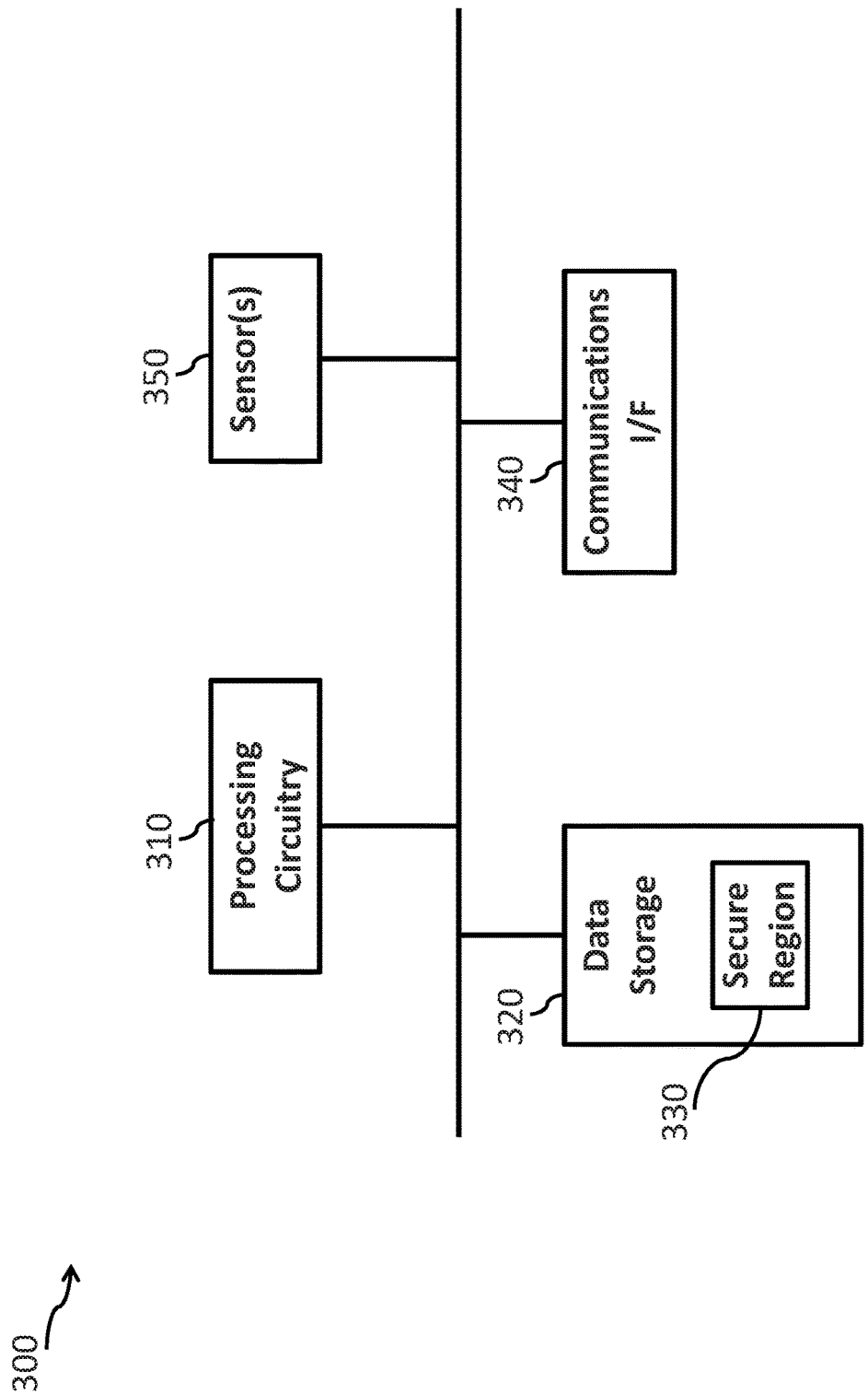
FIG. 3: Schematically illustrates an example of an electronic device which can be used to implement teachings of the disclosure.

FIG. 3 schematically illustrates an example of an electronic device 300. The device has processing circuitry 310 for performing data processing in response to program instructions, data storage 320 for storing data and instructions to be processed by the processing circuitry 310. The data storage 320 may have a secure region 330 which is protected by hardware mechanisms (e.g. using memory protection units or security mechanisms providing a trusted execution environment) or by software mechanisms (e.g. encryption), so that data stored in a secure region 330 is inaccessible to software not executing within a trusted environment. The device 300 has a communications interface 340 for communicating with external devices. For example communications interface 340 could use any other range of different communication protocols, such as Ethernet, WiFi®, Bluetooth®, ZigBee®, etc. The device may have one or more sensors 350 for sensing certain external conditions such as temperature, pressure, the proximity of a nearby user, etc. The specific sensors 350 provided may depend on the purpose of the device. It will be appreciated that FIG. 3 is merely an example of possible hardware that may be provided in the device and other components may also be provided. For example, some devices for which user interaction is expected may be provided with a display and/or a user interface module in order to display information to the user and receive input from the user. Other types of devices may simply be sensors which capture data and transmit the data to an external device and so these types of devices may not need a user interface or display. In some examples, the device does not include dedicated hardware asymmetric verifier circuitry (e.g. asymmetric acceleration hardware) such that any asymmetric verification must be performed through the "general purpose" processing circuitry 310.

The methods discussed above may be performed under control of a computer program executing on a device. Hence a computer program may comprise instructions for controlling a device to perform any of the methods discussed above. The program can be stored on a storage medium. The storage medium may be a non-transitory recording medium or a transitory signal medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

Further examples of feature combinations taught by the present disclosure are set out in the following numbered clauses:

1. A verification extension method for a device, the method comprising:
   obtaining, in response to a request to verify a signature associated with first data, an asymmetric verifier application from off-device storage;
   loading the asymmetric verifier application;
   executing the asymmetric verifier application;
   verifying, using the asymmetric verifier application, the signature associated with the first data using asymmetric-key cryptography.
2. The verification extension method of clause 1, wherein the signature associated with the first data is a signature of a hash of the first data.
3. The verification extension method of clause 1 or clause 2, wherein the first data is a further application.
4. The verification extension method of any preceding clause, wherein prior to executing the asymmetric verifier application verifying, using a first hashing function and an initial application hash, the asymmetric verifier application and responsive to a positive verification result, executing the asymmetric verifier application.
5. The verification extension method of clause 4, wherein the asymmetric verifier application is verified using a master bootloader of the device.
6. The verification extension method of clause 4 or clause 5, wherein the initial application hash is retrieved from on-device storage.
7. The verification extension method of clause 6, wherein the initial application hash is embedded on the device during manufacture or assembly of the device.
8. The verification extension method of any preceding clause, wherein the asymmetric verifier application verifies the signature using one or more keys stored in on-device storage.
9. The verification extension method of clause 8, wherein a plurality of keys are stored in on-device storage, wherein each of the keys is associated with a privilege level, and wherein restrictions associated with the privilege level of the key which verifies the signature associated with the first data are applied to that first data.
10. The verification extension method of clause 8 or clause 9, wherein the one or more keys are embedded on the device during manufacture or assembly of the device.
11. The verification extension method of any of clauses 1 to 7, wherein the asymmetric verifier application verifies the signature using one or more keys embedded in the asymmetric verifier application.
12. The verification extension method of any preceding clause, wherein responsive to a positive or a negative verification of the signature associated with the first data the asymmetric verifier application is unloaded.
13. The verification extension method of any preceding clause, wherein a plurality of signatures corresponding to a plurality of data including the first data are verified using the asymmetric verifier application and responsive to completion of the plurality of signatures being individually positively or negatively verified, the asymmetric verifier application is unloaded.
14. The verification extension method of any preceding clause, wherein responsive to a positive verification of the signature associated with the first data, the first data is loaded.
15. The verification extension method of any preceding clause, wherein the signature associated with the first data is a signature of a hash of the first data and responsive to a positive verification of the signature associated with the first data, the hash of the first data is stored on the device.
16. The verification extension method of clause 15, the method further comprising:
   obtaining the first data;
   loading the first data; and
   verifying, using the hash of the first data and a second hashing function, the first data.
17. The verification extension method of clause 16, wherein responsive to positive verification of the first data, the first data is executed or made available for use by executable code.
18. The verification extension method of clause 17, wherein after the first data has been executed or made available for use by executable code the hash of the first data is removed from the device.
19. The verification extension method of any of clauses 16 to 18, wherein the first hashing function and the second hashing function algorithms use the same computational function but take different data as inputs.
20. The verification extension method of any preceding clause, wherein the device does not include a hardware asymmetric verifier circuitry.
21. A computer program for controlling a device to perform the method of any of clauses 1 to 20.
22. A storage medium storing the computer program of clause 21.
23. An apparatus comprising:
   processing circuitry to perform data processing; and data storage storing a computer program for controlling the processing circuitry to perform the method of any of clauses 1 to 20.

The invention claimed is:

1. A verification extension method for a device, the method comprising:
obtaining, in response to a request to verify a signature associated with first data, an asymmetric verifier application from off-device storage;
loading the asymmetric verifier application obtained from the off-device storage;
prior to executing the asymmetric verifier application, verifying the asymmetric verifier application using a first hashing function and an initial asymmetric verifier application hash retrieved from on-device storage;
in response to positively verifying the asymmetric verifier application, executing the asymmetric verifier application;
verifying, using the asymmetric verifier application, the signature associated with the first data using asymmetric-key cryptography; and
in response to a positive or negative verification of the signature associated with the first data, unloading the asymmetric verifier application.

2. The verification extension method of claim 1, wherein the signature associated with the first data is a signature of a hash of the first data.

3. The verification extension method of claim 1, wherein the first data is a further application.

4. The verification extension method of claim 1, wherein the asymmetric verifier application is verified using a master bootloader of the device.

5. The verification extension method of claim 1, wherein the initial application hash is embedded on the device during manufacture or assembly of the device.

6. The verification extension method of claim 1, wherein the asymmetric verifier application verifies the signature using one or more keys stored in on-device storage.

7. The verification extension method of claim 6, wherein a plurality of keys are stored in on-device storage, wherein each of the keys is associated with a privilege level, and wherein restrictions associated with the privilege level of the key which verifies the signature associated with the first data are applied to that first data.

8. The verification extension method of claim 6, wherein the one or more keys are embedded on the device during manufacture or assembly of the device.

9. The verification extension method of claim 1, wherein the asymmetric verifier application verifies the signature using one or more keys embedded in the asymmetric verifier application.

10. The verification extension method of claim 1, wherein a plurality of signatures corresponding to a plurality of data including the first data are verified using the asymmetric verifier application, and
wherein responsive to completion of the plurality of signatures being individually positively or negatively verified, the asymmetric verifier application is unloaded.

11. The verification extension method of claim 1, wherein responsive to a positive verification of the signature associated with the first data, the first data is loaded.

12. The verification extension method of claim 1, wherein the signature associated with the first data is a signature of a hash of the first data, and
wherein responsive to a positive verification of the signature associated with the first data, the hash of the first data is stored on the device.

13. The verification extension method of claim 12, the method further comprising, after unloading the asymmetric verifier application:
obtaining the first data;
loading the first data; and
verifying, using the hash of the first data and a second hashing function, the first data.

14. The verification extension method of claim 13, wherein responsive to positive verification of the first data, the first data is executed or made available for use by executable code, optionally wherein after the first data has been executed or made available for use by executable code the hash of the first data is removed from the device.

15. A non-transitory, computer-readable storage storing a computer program for controlling a device to perform the method of claim 1.

16. An apparatus comprising:
processing circuitry to perform data processing; and
data storage storing a computer program for controlling the processing circuitry to perform the method of claim 1.

* * * * *